US010939261B2

(12) United States Patent
Chin et al.

(10) Patent No.: US 10,939,261 B2
(45) Date of Patent: Mar. 2, 2021

(54) TECHNIQUES TO INTERFACE AND ROUTE PACKETS IN C-V2X DEVICES

(71) Applicant: QUALCOMM Incorporated, San Diego, CA (US)

(72) Inventors: Tom Chin, San Diego, CA (US); Juan Zhang, San Diego, CA (US); Ajith Tom Payyappilly, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/566,228

(22) Filed: Sep. 10, 2019

(65) Prior Publication Data
US 2020/0107169 A1 Apr. 2, 2020

Related U.S. Application Data

(60) Provisional application No. 62/738,139, filed on Sep. 28, 2018.

(51) Int. Cl.
*H04W 4/40* (2018.01)
*H04L 29/12* (2006.01)
*H04W 28/06* (2009.01)
*H04W 72/04* (2009.01)

(52) U.S. Cl.
CPC ........... *H04W 4/40* (2018.02); *H04L 61/2007* (2013.01); *H04W 28/06* (2013.01); *H04W 72/0453* (2013.01)

(58) Field of Classification Search
None
See application file for complete search history.

(56) References Cited

U.S. PATENT DOCUMENTS

| 9,609,488 | B2* | 3/2017 | Sukumar | H04W 48/18 |
| 9,979,790 | B1* | 5/2018 | Park | H04L 69/18 |
| 10,484,911 | B1* | 11/2019 | Bogineni | H04W 76/10 |

(Continued)

FOREIGN PATENT DOCUMENTS

WO 2013173553 A2 11/2013

OTHER PUBLICATIONS

International Search Report and Written Opinion—PCT/US2019/050647—ISA/EPO—dated Nov. 25, 2019.

Primary Examiner — Lonnie V Sweet
(74) Attorney, Agent, or Firm — Arent Fox LLP

(57) ABSTRACT

Aspects of the present disclosure provide techniques for routing internet protocol (IP) and non-IP packets in cellular vehicle-to-everything devices that can be transmitted over the air via cellular or side-link device-to-device (D2D) communication systems without the need for the applications (e.g., automotive applications) to modify its operations. Specifically, an application (automotive application or web browser) may use default Application Programming Interface (API) that is typically used for regular cellular communication without modifying its operations to differentiate between IP and non-IP packets. Instead, in accordance with present disclosure, logical data paths may be dynamically adjusted to map services associated with the packets with an appropriate media access control (MAC) flow such that the modem receiving the packet may process and route the packet to target end-destination.

30 Claims, 8 Drawing Sheets

(56) References Cited

U.S. PATENT DOCUMENTS

| | | | |
|---|---|---|---|
| 2005/0066074 A1* | 3/2005 | Suh | G06F 15/167 |
| | | | 710/22 |
| 2010/0118845 A1* | 5/2010 | Solver | H04L 61/2503 |
| | | | 370/338 |
| 2013/0044679 A1* | 2/2013 | Rathonyi | H04W 80/045 |
| | | | 370/328 |
| 2014/0018125 A1* | 1/2014 | Shoshan | G06F 9/54 |
| | | | 455/550.1 |
| 2015/0056991 A1 | 2/2015 | Seth | |
| 2015/0372979 A1* | 12/2015 | Runeson | H04L 63/0254 |
| | | | 726/13 |
| 2016/0212596 A1* | 7/2016 | Brahmi | H04W 72/042 |
| 2018/0063781 A1* | 3/2018 | Deng | H04W 8/22 |
| 2018/0255155 A1* | 9/2018 | Markham | H04L 41/22 |
| 2018/0279175 A1 | 9/2018 | Gholmieh et al. | |
| 2019/0268732 A1* | 8/2019 | Lu | H04W 4/50 |
| 2019/0306770 A1* | 10/2019 | Vesterinen | H04W 8/24 |
| 2020/0045762 A1* | 2/2020 | Raghuram | H04W 76/30 |

* cited by examiner

TECHNIQUES TO INTERFACE AND ROUTE PACKETS IN C-V2X DEVICES

CROSS-REFERENCE TO RELATED APPLICATION(S)

This application claims benefit of U.S. Provisional Application Ser. No. 62/738,139, entitled "TECHNIQUES TO INTERFACE AND ROUTE PACKETS IN C-V2X DEVICES" and filed Sep. 28, 2018, which is expressly incorporated by reference herein in its entirety.

BACKGROUND

The present disclosure relates to wireless communication systems, and more particularly, to techniques to interface and route packets in cellular vehicle-to-everything (C-V2X) devices.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Generally, in a smartphones, data cards, or other wireless communication devices (individually and collectively user equipment (UE)), packets generated by applications (e.g., web browser or social media applications) are typically internet protocol (IP) packets. In such instances, the modem associated with the UE may accept the IP packets and transmit the IP packets over the air to the target device (e.g., base station) via the cellular network.

However, in recent years, there has been significant focus on development and implementation of technologies that assist drivers in avoiding accidents and enabling an autonomous vehicle to drive itself. So called "self-driving cars" include sophisticated sensors and processing systems that control the vehicle based on information collected from the car's sensors, processors, and other electronics, in combination with mapping information received from external networks. Such self-driving vehicles may also utilize cellular vehicle-to-everything (C-V2X) communication that may be implemented as part of the 5G NR technology deployment. In a C-V2X system, vehicles or UEs within vehicles may directly communicate with other vehicles or other UEs by directing radio signals in specific directions.

The C-V2X communication is enabled by automotive applications that may reside over the high-level operating system (HLOS) on an application processor. However, current UEs are ill-equipped to process and route packets generated by the C-V2X applications because C-V2X application may not be limited to generating only IP packets, but may also include non-IP packets. Thus, as the demand for mobile broadband access continues to increase, further improvements in communications technology and beyond may be desired.

SUMMARY

Aspects of the present disclosure provide techniques for routing IP packets and non-IP packets in C-V2X devices that can be transmitted over the air via cellular or side-link device-to-device (D2D) communication systems without the need for the applications (e.g., automotive applications) to modify its operations. Specifically, an application (automotive application or web browser) may use a default Application Programming Interface (API) that is typically used for regular cellular communication without modifying its operations to differentiate between IP and non-IP packets. Instead, in accordance with present disclosure, logical data paths may be dynamically adjusted to map services associated with the packets with an appropriate media access control (MAC) flow such that the modem receiving the packet may process and route the packet to target end-destination.

In one example, a method for wireless communications is disclosed. The method may include signaling, at a modem of the UE, one or more identifiers for one or more network resources available for access via C-V2X communication to an application processor of the UE. The method may further include generating, at the modem, an IP address for at least one of the one or more identifiers. The method may further comprise transmitting the IP address for each of the one or more identifiers to the application processor, wherein an application utilizes the IP address for the at least one of the one or more identifiers to transmit a payload packet from the application processor to the modem.

In another example, an apparatus for wireless communications is disclosed. The apparatus may include a memory configured to store instructions and a processor communicatively coupled with the processor. The processor may be configured to execute the instructions to signaling, at a modem of the UE, one or more identifiers for one or more network resources available for access via C-V2X communication to an application processor of the UE, and at the modem, an IP address for at least one of the one or more identifiers. The processor may further be configured to execute instructions to transmit the IP address for each of the one or more identifiers to the application processor, wherein an application utilizes the IP address for the at least one of the one or more identifiers to transmit a payload packet from the application processor to the modem.

In another example, a non-transitory computer readable medium storing instructions, executable by a processor, for wireless communications is disclosed. The computer readable medium may include instructions for signaling, at a modem of the UE, one or more identifiers for one or more network resources available for access via C-V2X communication to an application processor of the UE, and generating, at the modem, an IP address for at least one of the one or more identifiers. The computer readable medium may further include transmitting the IP address for each of the one or more identifiers to the application processor, wherein an application utilizes the IP address for the at least one of the one or more identifiers to transmit a payload packet from the application processor to the modem.

In another example, another apparatus for wireless communication is disclosed. The apparatus may include means for signaling, at a modem of the UE, one or more identifiers for one or more network resources available for access via C-V2X communication to an application processor of the UE. The apparatus may further include means for generating, at the modem, an IP address for at least one of the one or more identifiers. The apparatus may further include means for transmitting the IP address for each of the one or more identifiers to the application processor, wherein an application utilizes the IP address for the at least one of the one or more identifiers to transmit a payload packet from the application processor to the modem.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
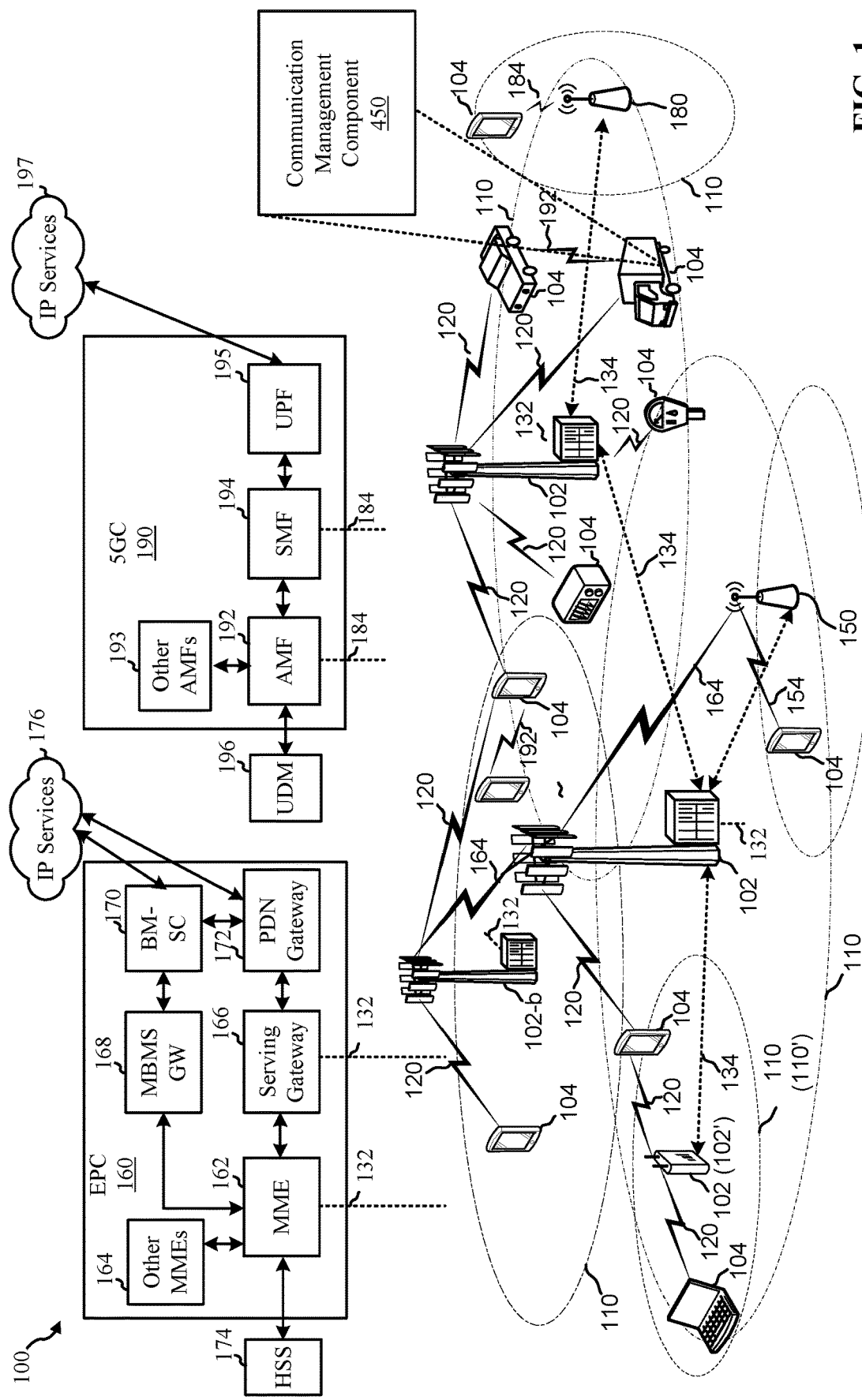
FIG. 1 is a schematic diagram of an example of a wireless communications system in accordance with aspects of the present disclosure.

As discussed above, generally for smartphones or other wireless communication devices (individually and collectively user equipment (UE)), packets generated by applications (e.g., web browser or social media applications) are typically internet protocol (IP) packets. However, in a C-V2X system, vehicles or UEs within vehicles may also directly communicate with other vehicles or other UEs by directing radio signals in specific directions. As such, in addition to retaining the capability to support traditional IP applications, UEs with C-V2X capabilities may also include one or more automotive applications (e.g., accident avoidance application that may communicate information with other vehicles in the area via side-link D2D communication). Thus, UEs with C-V2X capabilities may generate both IP and non-IP packets. Traditionally, managing the diverse packet types may require the UE to implement multiple socket APIs and/or require the application to modify its operations to transport IP packets in contrast to non-IP packets. However, such modifications may increase costs related to development of application processor.

Aspects of the present disclosure provide techniques for routing IP and non-IP packets in C-V2X devices that can be transmitted over the air via different RATs without the need for the applications running on an application processor to modify its operations or require multiple socket APIs. Specifically, features of the present disclosure allow the applications to use the same socket API that is utilized for regular cellular communications to generate and transport both IP and non-IP packets, and thereby reduce costs associated with the UEs. Thus, in contrast to current systems, features of the present disclosure adjust the processing of IP and non-IP packets, by the modem, at lower layers of the open system interconnection (OSI) model. This allows the applications (e.g., layer 7) to continue operating without modifying its operations to transport IP packets from a different mechanism to handle non-IP packets or relying on multiple socket APIs. It should be appreciated that while the techniques presented herein by example are shown for C-V2X devices, those of skill in the art will recognize that the techniques may be applied to other like communication technologies, including device to device (D2D) communications.

Thus, depending on the end-destination of the packet, features of the present disclosure allow the modem to transmit the packet generated by the application on different air interfaces. For example, the modem may transmit the application generated packets (IP or non-IP packets) over either the cellular network over wireless wide area network (WWAN) to a server on the network for provisioning type communication or over internet using one or more RATs such as 5G new radio (NR), long term evolution (LTE) network, universal mobile telecommunications system (UMTS), etc. Additionally or alternatively, the modem may also route the packets to a peer device for D2D communications over side-link communications (e.g., 5G NR side-link or LTE side-link) depending on the type of packet and the target destination of the packet.

To this end, in accordance with aspects of the present disclosure, the modem of the UE may implement and advertise (e.g., signal or indicate) to the application processor the availability of C-V2X specific access point name (APN) or data network name (DNN) in addition to the regular DNNs/APNs (e.g., internet, IP Multimedia Core Network Subsystem (IMS), etc.) that are supported by the modem. The C-V2X specific APNs/DNNs may include C-V2X-IP APN and C-V2X-non-IP APN. Each of the APNs/DNNs may be controlled by a C-V2X mode handler (MH) (see FIG. 2) in the modem. For each of the C-V2X specific APNs (e.g., C-V2X-IP APN and C-V2X-non-IP APN), the modem may create a IP address and provide the IP addresses of each of the C-V2X-IP APN and C-V2X-non-IP APN to the application processor. In some instances, the unique IP address associated with the C-V2X-non-IP APN may be a IP address. Assignment of IP address for C-V2X-non-IP APN may allow the application to treat and generate all outgoing packets, including non-IP packets, as an IP packet (e.g., affix an IP header for the payload).

In turn, the automotive applications residing on the application processor may use standard HLOS socket API to bring up a network interface for each of the C-V2X specific APNs and open a port for each service ID associated with the packet. Specifically, the application processor may generate a table mapping one or more ports with corresponding one or more application service IDs. The mapping table may be provided to the modem such that for any subsequent packets received by the modem, the C-V2X mode handler of the modem may process and route the packet based on the type of packet (e.g., IP or non-IP packet) and the intended target destination of the packet.

For example, for non-IP packets generated by automotive applications, the application may utilize the IP address for C-V2X-non-IP APN assigned by the modem to setup a data bridge between the application processor and the modem. While setting up the APN, the C-V2X mode handler may register uplink and downlink data paths with lower layer to prepare the upcoming data transfer. With the APN setup, the automotive application may utilize the IP address for data (e.g., packet payload) to transfer the data from the application processor to the modem. To achieve this, the application may use standard operating system socket API to bind or map the packet to a specific port from a plurality of available ports. Application may also register the application service ID (e.g., C-V2X service ID) and the corresponding port to the modem. Thereafter, the application may start sending data packets using the selected port. In some examples, the traffic class in the IP header may be overloaded to represent the C-V2X packet priority. For example, if the packet is a collision avoidance packet to be sent to nearby vehicles using D2D communication, the application may designate the packet as a high priority packet in the traffic class of the IP header.

In some examples, the packet may be received by the C-V2X mode handler at the modem from the application processor via the selected port and hardware interconnect (e.g., universal serial bus (USB), peripheral component interconnect express (PCIe), high speed inter-chip (HSIC), Ethernet, etc.) between the application processor and the modem. The C-V2X mode handler, upon receiving the packet, may determine the service ID associated with the packet in addition to the packet priority, if any. In some examples, the C-V2X mode handler may identify the service ID associated with the packet based on the port from which the packet is received at the modem by referencing the mapping table that the application processor may have made available to the modem prior to transmission of the packet. Because the packet is a non-IP packet, the C-V2X mode handler may remove the IP and UDP header information affixed to the packet such that the payload is transmitted over the air over selected RAT (e.g., 5G-NR side-link, LTE-D side-link, etc.).

Alternatively, in the instance that the generated packet for transport is an IP packet, it should be appreciated that the steps undertaken by the application processor and modem may largely mirror those identified above with respect to non-IP packets with the exception that for the IP packets, the packet may be transmitted along with the IP address information to the lower layer. In such a manner, the structure of the applications and modem may be simplified and reduce device costs. Additionally, as will be explained below, the steps for reception of IP and non-IP packets at the modem to be forwarded to the application may also be implemented in accordance with aspects of the present disclosure to provide benefit over conventional systems.

Various aspects are now described in more detail with reference to the FIGS. 1-5. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, one or more UEs 104 may be configured for C-V2X communications between UEs 104. The UEs 104 may include various devices related to vehicles and transportation. For example, the UEs 104 may include vehicles, devices within vehicles, and transportation infrastructure such as roadside devices, tolling stations, fuel supplies, or any other device that that may communicate with a vehicle. A UE 104 may act as either a host device or a client device for C-V2X communication. A host UE 104 may advertise (or "signal" or "indicate") C-V2X services supported by the host UE 104. A client UE 104 may also discover C-V2X services supported by the host UE 104. Moreover, a UE 104 may act as both a host and a client. For example, a vehicle may act as a host to provide speed and braking updates to surrounding vehicles and/or act as a client to communicate with a tolling station. As noted above, in order to support C-V2X communications, the UEs 104 may include one or more automotive applications that may generate both IP and non-IP packets. To this end, the UE 104 may include a communication management component 450 (see FIG. 4) for routing IP and non-IP packets in C-V2X devices that can be transmitted over the air via different RATs without the need for the applications running on an application processor to modify its operations or require multiple socket APIs. Specifically, features of the present disclosure allow the applications to use the same socket API that is utilized for regular communications to generate and transport both IP and non-IP packets, and thereby reduce hardware costs associated with the UEs.

Figure 2:
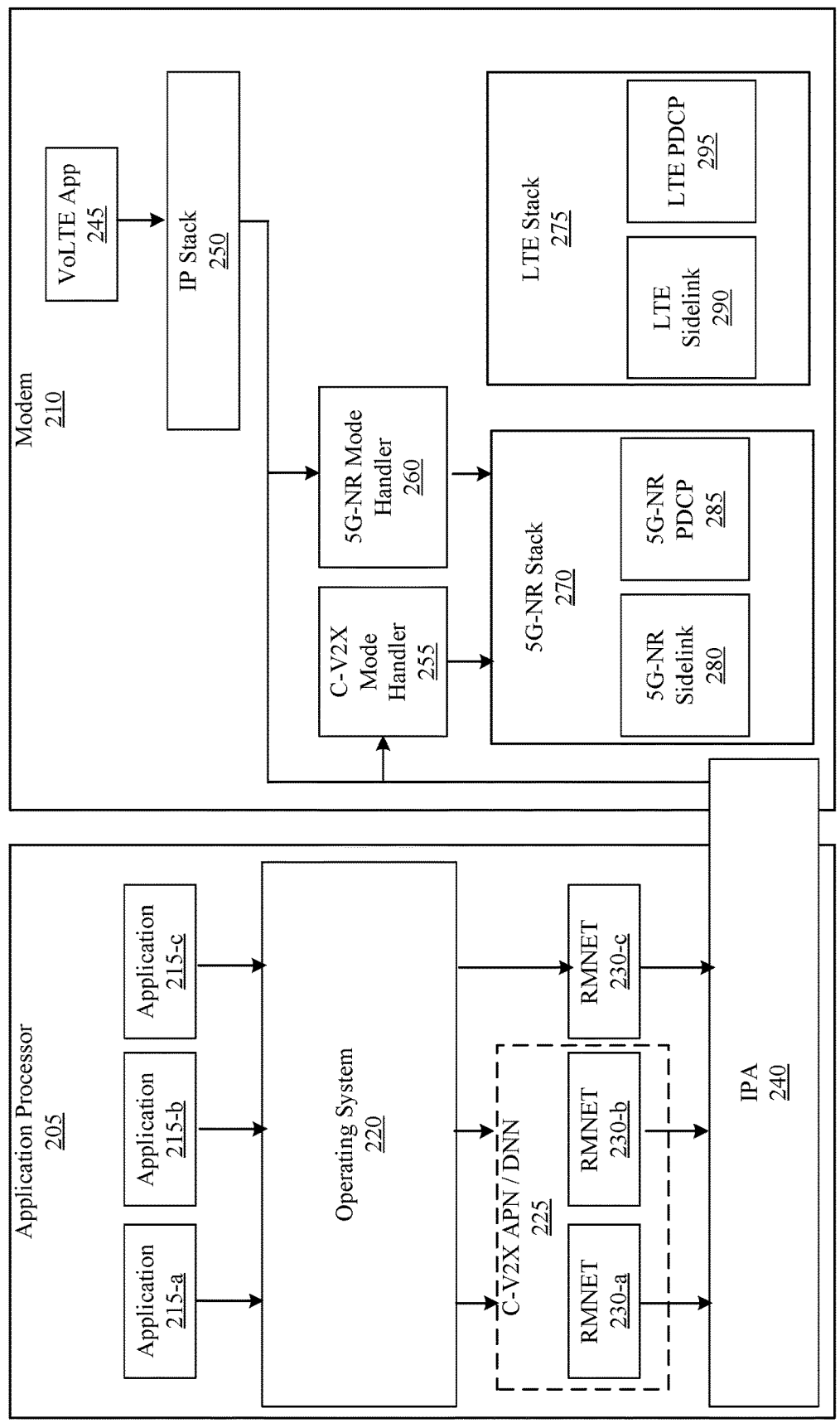
FIG. 2 is a schematic diagram of an example of the UE interface for interconnecting the application processor with the modem to route IP packets and non-IP packets in accordance with aspects of the present disclosure.

FIG. 2 is a schematic diagram 200 of the UE 104 facilitating the routing of IP packets and non-IP packets in C-V2X system. In some examples, the UE 104 may include an application processor 205 in communication with a modem 210. The application processor 205 may include one or more applications 215, including automotive specific applications. While the present disclosure discusses automotive specific applications as generating non-IP packets, it should also be appreciated by those of ordinary skill that features of the present disclosure may also be implemented for any type of application that may generate non-IP packets. For example, the application processor 205 may execute a first application 215-*a* that may be an automotive application for side-link communication with other vehicles and UEs 104, a second application 215-*b* that may be another automotive application for provisioning interface (e.g., communications to a remote server), and a third application 215-*c* that may be an internet application (e.g., web browser).

The application processor 205 may further include a HLOS 220 such as Linux, Android, QNX, etc. which may provide standard sockets APIs for the one or more applications 215. In some instances, the applications 215 may reside over the HLOS 220 and utilize standard sockets API provided by the HLOS 220 to send and receive data packets. The HLOS 220 may generally treat all data packets sent and received by the one or more applications 215 with the modem 210 may be IP communication (e.g., IP packets).

In accordance with aspects of the present disclosure, the modem 210 may implement and advertise to the application processor the availability of C-V2X specific APNs or DNNs 225 (RmNet Drivers) in addition to the regular DNNs/APNs 230-*c* (e.g., internet, IP Multimedia Core Network Subsystem (IMS), etc.) that are supported by the modem 210. As would be appreciated by those of ordinary skill in the art, an APN/DNN identifies the packet data network (PDN) that application 215 wants to communicate with. In addition to identifying a PDN, an APN may also be used to define the type of service, (e.g. connection to Wireless Application Protocol (WAP) server, Multimedia Messaging Service (MMS)) that is provided by the PDN.

The C-V2X specific APNs/DNNs 225 may include C-V2X-non-IP APN 230-*a* and C-V2X-IP APN 230-*b*. For each of the C-V2X specific APNs 225 (e.g C-V2X-non-IP APN 230-*a* and C-V2X-IP APN 230-*b*), the modem may create a unique IP address and provide the IP addresses of each of the C-V2X-non-IP APN 230-*a* and C-V2X-IP APN 230-*b* to the application processor 205. In some instances, the unique IP address associated with the C-V2X-non-IP APN 230-*a* may be IP address. Assignment of IP address for C-V2X-non-IP APN 230-*a* may allow the application to treat and generate all outgoing packets, including non-IP packets, as an IP packet (e.g., affix an IP header for the payload).

In some examples, the automotive applications (e.g., first application 215-*a* and second application 215-*b*) residing on the application processor 205 may use standard HLOS socket API to bring up the network interface for each of the C-V2X specific APNs 225 and open a port for each service ID associated with the packet. Specifically, the application processor 205 may generate a table mapping one or more ports with corresponding one or more service IDs. The mapping table may be provided to the modem 210 such that for any subsequent packets received by the modem 210, the C-V2X mode handler 255 of the modem 210 may process and route the packet based on the type of packet (e.g., IP or non-IP packet) and the intended target destination of the packet.

For example, for non-IP packets generated by first automotive application 215-*a*, the first automotive application 215-*a* may utilize the IP address for C-V2X-non-IP APN 230-*a* assigned by the modem 210 to setup a data bridge between the application processor 205 and modem 210. With the APN setup 225, the automotive application 215-*a* may utilize the IP address associated with C-V2X-non-IP APN 230-*a* for data (e.g., packet payload) to transfer the data from the application processor 205 to the modem 210. To achieve this, the first application 215-*a* may use standard operating system socket API to bind or map the packet to a specific port from a plurality of available ports. The first application 215-*a* may also register the application service ID (e.g., C-V2X service ID) and the corresponding port to the modem 210. Thereafter, the application 215-*a* may start sending data packets using the selected port.

In some examples, the packet transmitted by first application 215-*a* may be received by the C-V2X mode handler 255 at the modem from the application processor 205 via the selected port and hardware interconnect 240 between the application processor 205 and the modem 210. The C-V2X mode handler 255, upon receiving the packet, may determine the service ID associated with the packet in addition to the packet priority, if any. In some examples, the C-V2X mode handler 255 may identify the service ID associated with the packet based on the port from which the packet is received at the modem 210 by correlating the port to the mapping table that the application processor may have made available to the modem prior to transmission of the packet. Because the packet is a non-IP packet, the C-V2X mode handler 255 may remove the IP and UDP header information affixed to the packet such that only the payload is transmitted over the air over selected RAT (e.g., 5G-NR 270 or LTE stack 275). Further, for each RAT, the C-V2X mode handler 255 may determine whether the packet is to be transmitted via side-link communication (e.g., 5G-NR side-link 280, LTE side-link 290, etc.) or normal cellular communication (e.g., 5G-NR PDCP 285, LTE PDCP 295, etc.). Although FIG. 2 illustrates only two types of wireless communication technologies, it should be appreciated that additional RATs (e.g., WLAN) may also be implemented by the modem 210.

Figure 3A:
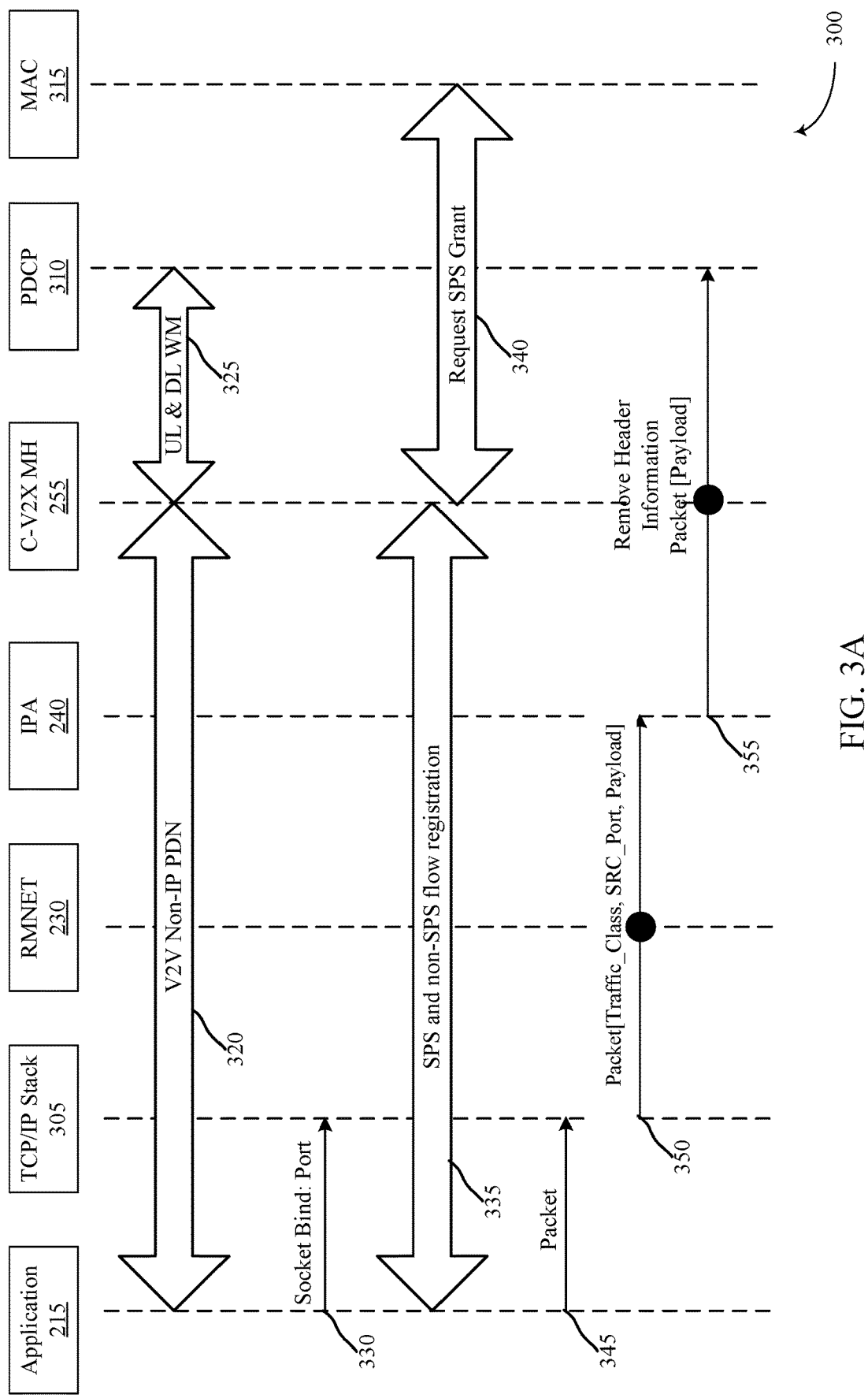
FIG. 3A is an example call flow diagram for C-V2X side-link data transfer with respect to non-IP packets in accordance with aspects of the present disclosure.

FIG. 3A is an example call flow diagram 300 for C-V2X side-link data transfer with respect to non-IP packets. The call flow diagram 300 includes one or more applications 215 (e.g., automotive application), transmission control protocol/IP stacks 305, RmNet drivers 230, and a physical interconnect 240 that may be part of the application processor 205. Additionally, the call flow diagram 300 may include C-V2X mode handler 255, PDCP 310, and MAC destination 315 that may be included in the modem 210 coupled to the application processor 205.

In some instances, at 320, the application 215 may setup a packet data network (PDN) gateway between the application and C-V2X mode handler 255 for facilitating transport of non-IP packets. Specifically, the application 215 may utilize the IP address for C-V2X-non-IP APN 230 assigned by the modem 210 to setup a data bridge between the application processor 205 and modem 210. At 325, the C-V2X Mode handler 255 may register an uplink and downlink watermark for queueing uplink or downlink transmissions for PDCP. Specifically, while setting up the DNN, the C-V2X mode handler 255 may register uplink and downlink data paths with the lower layers to prepare for the upcoming data transfer.

Once the DNN is setup, the application 215, at 330 may receive a virtual IP address for data transfer from the application processor 205 to the modem 210. The application 215 may use standard OS socket API to bind the packet to a specific port for transmitting the packet. The application 215 may further register the C-V2X service ID and the port the service ID is associated with to the modem 210 (and more particularly with the V2X mode handler 255). In other examples, the application 215 may include an identifier associated with the non-IP packet that identifies the packet as a non-IP packet. At 355, the application processor 205 and the C-V2X mode handler 255 at the modem 210 may initiate SPS and non-SPS flow registration that includes the C-V2X mode handler 255 and the destination MAC 315, at 340, request SPS grant.

At 345, the application 215 may start transmitting the data packet over the port associated with the service ID. In some examples, the traffic class in the IP header is overloaded to represent the C-V2X packet priority. Thus, in some examples, the packet may include the source port and traffic class information associated with the payload. At 350, the RmNet driver 230 may encapsulate the packet with IP and UDP header information prior to forwarding the packet to the modem 210.

At 355, the packet may be received by the C-V2X mode handler 255 that may determine that the packet is a non-IP packet. Specifically, the C-V2X mode handler 255 may identify the C-V2X packet priority from the traffic class and identify the corresponding service ID from the UDP port information included with the packet. A service ID may be preconfigured or provisioned to map the packet to a destination L2 address. Further, the C-V2X mode handler 255 may remove the IP and UDP header from the payload and route the packet payload to lower layers (as well as the priority and L2 address information) for transmission without the IP and UDP header information. Further, the C-V2X mode handler 255 may determine whether the packet is to be transmitted over 5G-NR side-link or LTE-D side-link for PC5 communications.

Figure 3B:
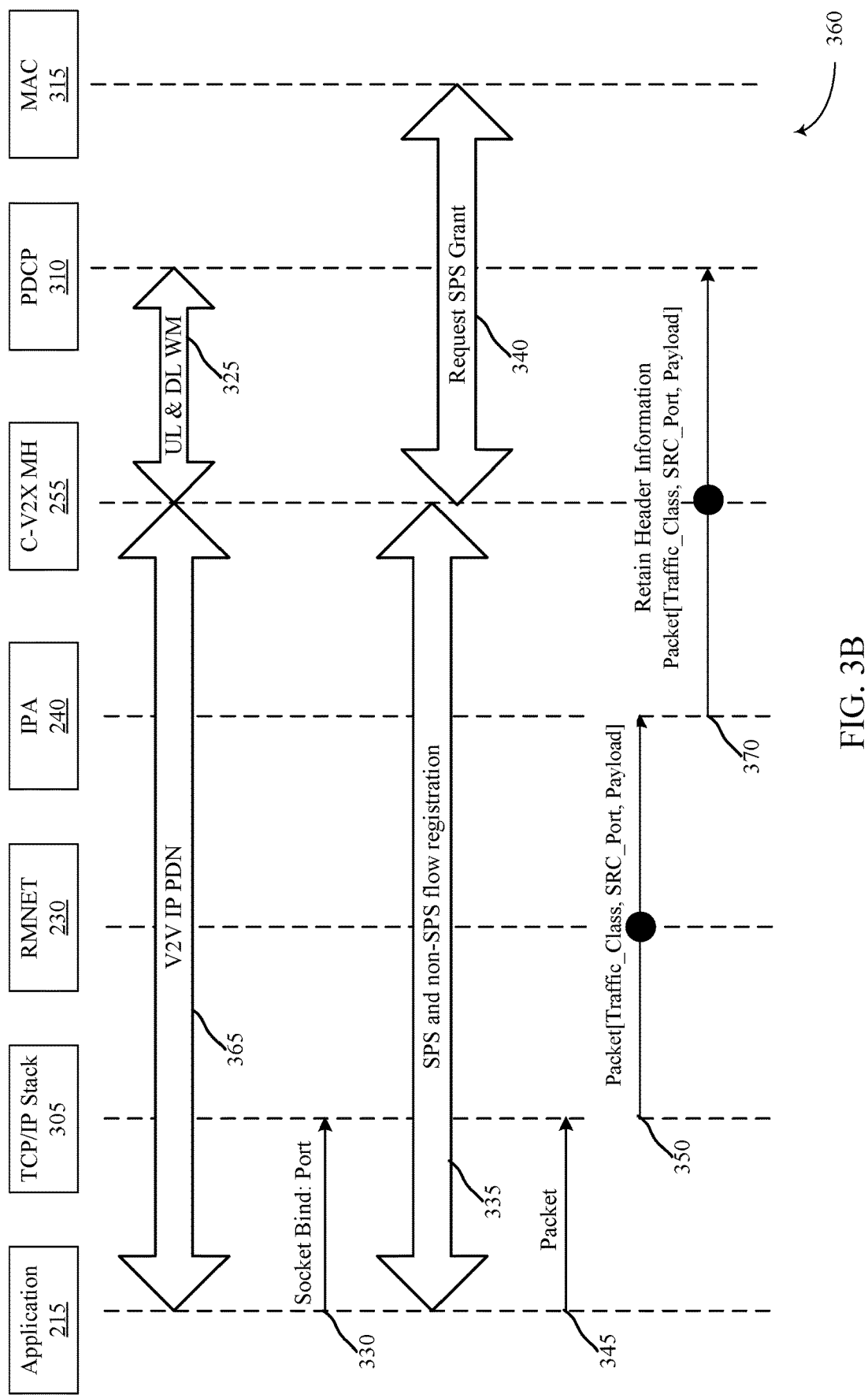
FIG. 3B is an example call flow diagram for C-V2X side-link data transfer with respect to IP packets in accordance with aspects of the present disclosure.

FIG. 3B is an example call flow diagram 360 for C-V2X side-link data transfer with respect to IP packets in accordance with aspects of the present disclosure. For purposes of this disclosure, the steps undertaken for transfer of IP packets may largely mirror initial steps as outlined with reference to FIG. 3A for non-IP packets. However, in contrast to removing the IP and UDP header information in terms of non-IP packet, the C-V2X mode handler 255, at 370 may retain the header information and route the IP packet to lower layer by including the priority and L2 address information. Further, the modem 210 may identify the RAT over which the IP packet is to be transmitted to the destination.

Figure 3C:
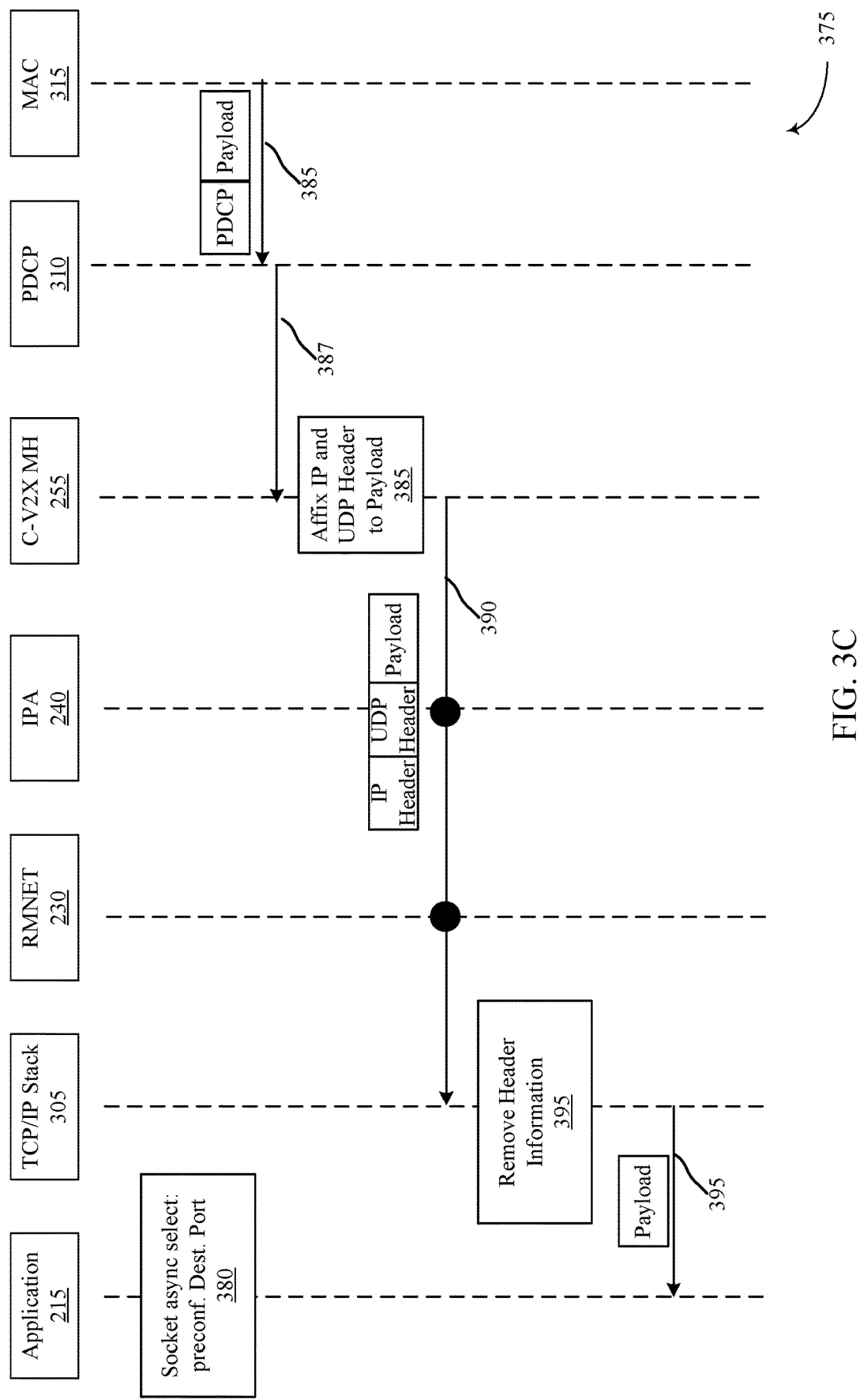
FIG. 3C is an example call flow 375 for C-V2X side-link reception of non-IP packets in accordance with aspects of the present disclosure.

FIG. 3C is an example call flow diagram 375 for C-V2X side-link reception of non-IP packets in accordance with aspects of the present disclosure. At 380, the application 215 may listen to a preconfigured fix port for data reception. As noted above, the port may be preconfigured or provisioned by the modem 210. At 385, a non-IP packet may be received at the PDCP 310 from a side-link D2D transmission (e.g., 5G NR side-link, LTE side-link, etc.). At 387, the PDCP 310 may provide the payload as well as priority and SDU type to the C-V2X mode handler 255. Upon receiving the packet, the C-V2X mode handler 255, at 385, may examine the SDU type information to determine whether the received packet is a non-IP packet. If so, the C-V2X mode handler 255 may affix a IP header (e.g., IP header, UDP header] to the packet and route, at 390, the packet from the modem 210 to the application processor 205 via the C-V2X non-IP DNN. At 395, the header information may be removed prior to transmitting, at 395, the payload to the application 215.

Figure 3D:
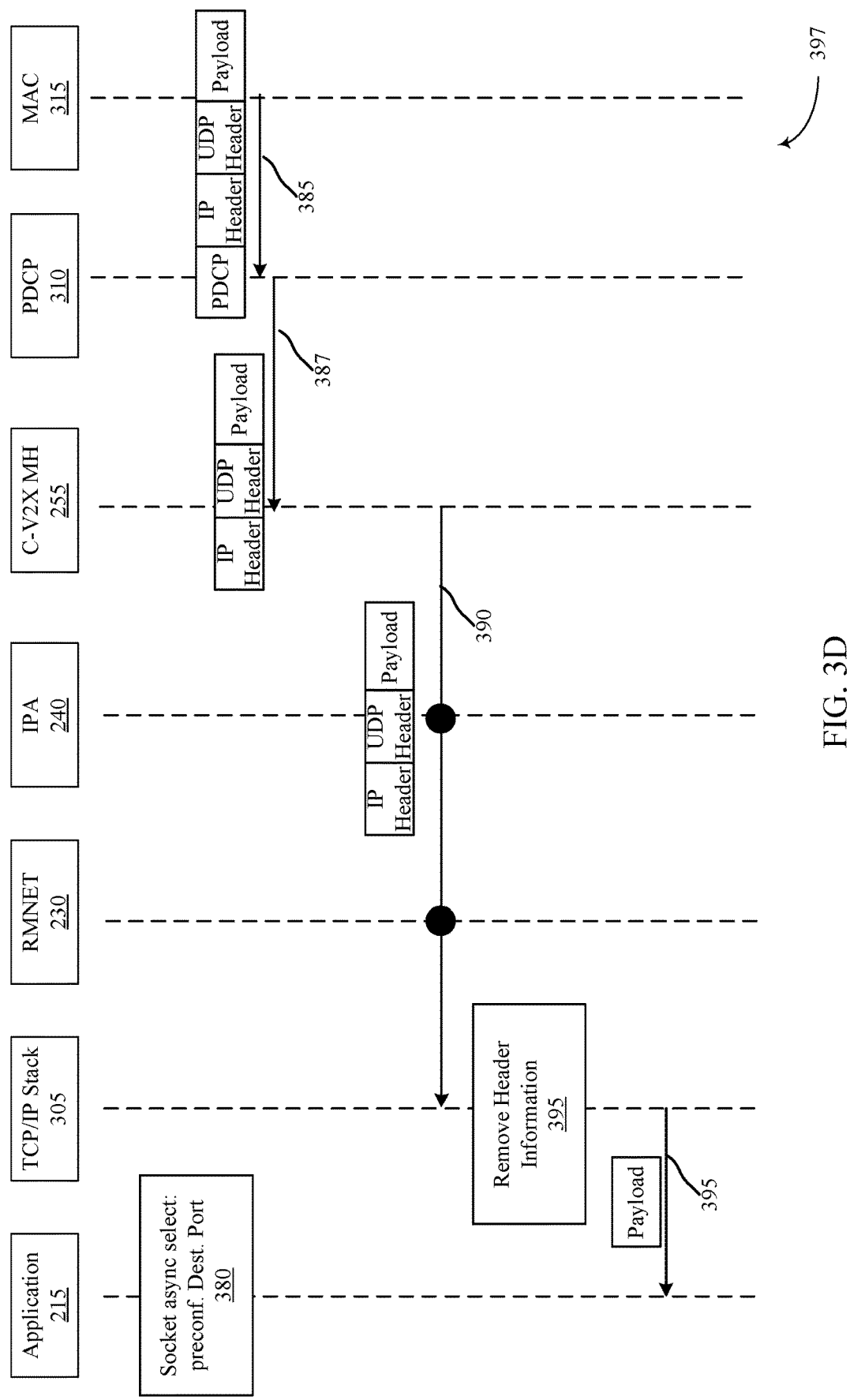
FIG. 3D is an example call flow diagram for C-V2X side-link reception of IP packets in accordance with aspects of the present disclosure.

FIG. 3D is an example call flow diagram 397 for C-V2X side-link data reception of IP packets in accordance with aspects of the present disclosure. For purposes of this disclosure, the steps undertaken for reception of IP packets may largely mirror initial steps as outlined with reference to FIG. 3C for non-IP packets. However, in contrast to needing the C-V2X mode handler 255 to affix a IP header information to a payload as in the instance of non-IP packets, the C-V2X mode handler 255 in processing IP packets (determined by evaluating the SDU type information included in the packet), may transmit the received packet directly to the application processor 210 over C-V2X IP DNN with all the header information.

Figure 4:
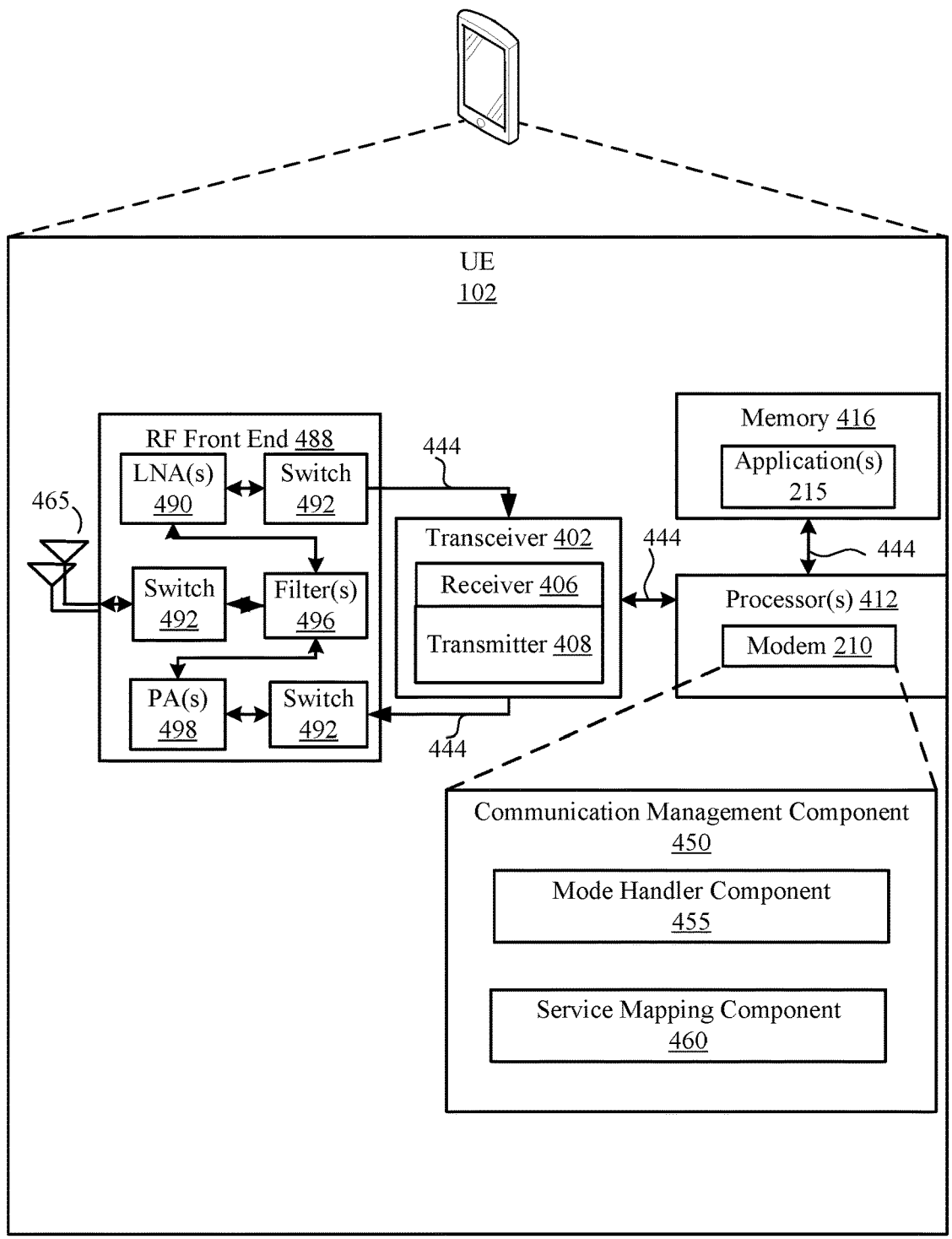
FIG. 4 is a schematic diagram of an example implementation of various components of the UE in accordance with various aspects of the present disclosure.

FIG. 4 illustrates a hardware components and subcomponents of a UE 104 for implementing one or more methods (e.g., methods 500) described herein in accordance with various aspects of the present disclosure. For example, one example of an implementation of the UE 104 may include a variety of components, some of which have already been described above, but including components such as one or more processors 412, memory 416 and transceiver 402 in communication via one or more buses 444, which may operate in conjunction with the communication management component 450 to perform functions described herein related to including one or more methods (e.g., 500) of the present disclosure. In some examples, the UE 104 may communicate with one or more base stations 102 or other UEs 104 wirelessly via antennas 465.

The one or more processors 412, modem 210, memory 416, transceiver 402, RF front end 488 and one or more antennas 465, may be configured to support voice and/or data calls (simultaneously or non-simultaneously) in one or more radio access technologies. In an aspect, the one or more processors 412 can include a modem 414 that uses one or more modem processors. The various functions related to communication management component 450 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with communication management component 450 may be performed by transceiver 402.

The memory 416 may be configured to store data used herein and/or local versions of application(s) 215 or traffic management component 450 and/or one or more of its subcomponents being executed by at least one processor 412. The memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, the memory 416 may be a non-transitory computer-readable storage medium that stores one or more computer-executable codes defining traffic management component 450 and/or one or more of its subcomponents, and/or data associated therewith, when the UE 104 is operating at least one processor 412 to execute communication management component 450 and/or one or more of its subcomponents.

The transceiver 402 may include at least one receiver 406 and at least one transmitter 408. The receiver 406 may include hardware, firmware, and/or software code executable by a processor for receiving data, the code comprising instructions and being stored in a memory (e.g., computer-readable medium). The receiver 406 may be, for example, a radio frequency (RF) receiver. In an aspect, the receiver 406 may receive signals transmitted by at least one UE 104. Additionally, receiver 406 may process such received signals, and also may obtain measurements of the signals, such as, but not limited to, Ec/Io, SNR, RSRP, RSSI, etc. The transmitter 408 may include hardware, firmware, and/or software code executable by a processor for transmitting data, the code comprising instructions and being stored in a memory (e.g., computer-readable medium). A suitable example of the transmitter 408 may including, but is not limited to, an RF transmitter.

Moreover, in an aspect, transmitting device may include the RF front end 488, which may operate in communication with one or more antennas 465 and transceiver 402 for receiving and transmitting radio transmissions, for example, wireless communications transmitted by at least one base station 102 or wireless transmissions transmitted by UE 104. The RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, the LNA 490 can amplify a received signal at a desired output level. In an aspect, each LNA 490 may have a specified minimum and maximum gain values. In an aspect, the RF front end 488 may use one or more switches 492 to select a particular LNA 490 and its specified gain value based on a desired gain value for a particular application.

Further, for example, one or more PA(s) 498 may be used by the RF front end 488 to amplify a signal for an RF output at a desired output power level. In an aspect, each PA 498 may have specified minimum and maximum gain values. In an aspect, the RF front end 488 may use one or more switches 492 to select a particular PA 498 and its specified gain value based on a desired gain value for a particular application.

Also, for example, one or more filters 496 can be used by the RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, the RF front end 488 can use one or more switches 492 to select a transmit or receive path using a specified filter 496, LNA 490, and/or PA 498, based on a configuration as specified by the transceiver 402 and/or processor 412.

As such, the transceiver 402 may be configured to transmit and receive wireless signals through one or more antennas 465 via the RF front end 488. In an aspect, the transceiver 402 may be tuned to operate at specified frequencies such that transmitting device can communicate with, for example, one or more base stations 102 or one or more cells associated with one or more base stations 102. In an aspect, for example, the modem 414 can configure the transceiver 402 to operate at a specified frequency and power level based on the configuration of the transmitting device and the communication protocol used by the modem 414.

In an aspect, the modem 414 can be a multiband-multimode modem, which can process digital data and communicate with the transceiver 402 such that the digital data is sent and received using the transceiver 402. In an aspect, the modem 414 can be multiband and be configured to support multiple frequency bands for a specific communications protocol. In an aspect, the modem 414 can be multimode and be configured to support multiple operating networks and communications protocols. In an aspect, the modem 414 can control one or more components of transmitting device (e.g., RF front end 488, transceiver 402) to enable transmission and/or reception of signals from the network based on a specified modem configuration. In an aspect, the modem configuration can be based on the mode of the modem 414 and the frequency band in use. In another aspect, the modem configuration can be based on UE configuration information associated with transmitting device as provided by the network during cell selection and/or cell reselection.

Figure 5:
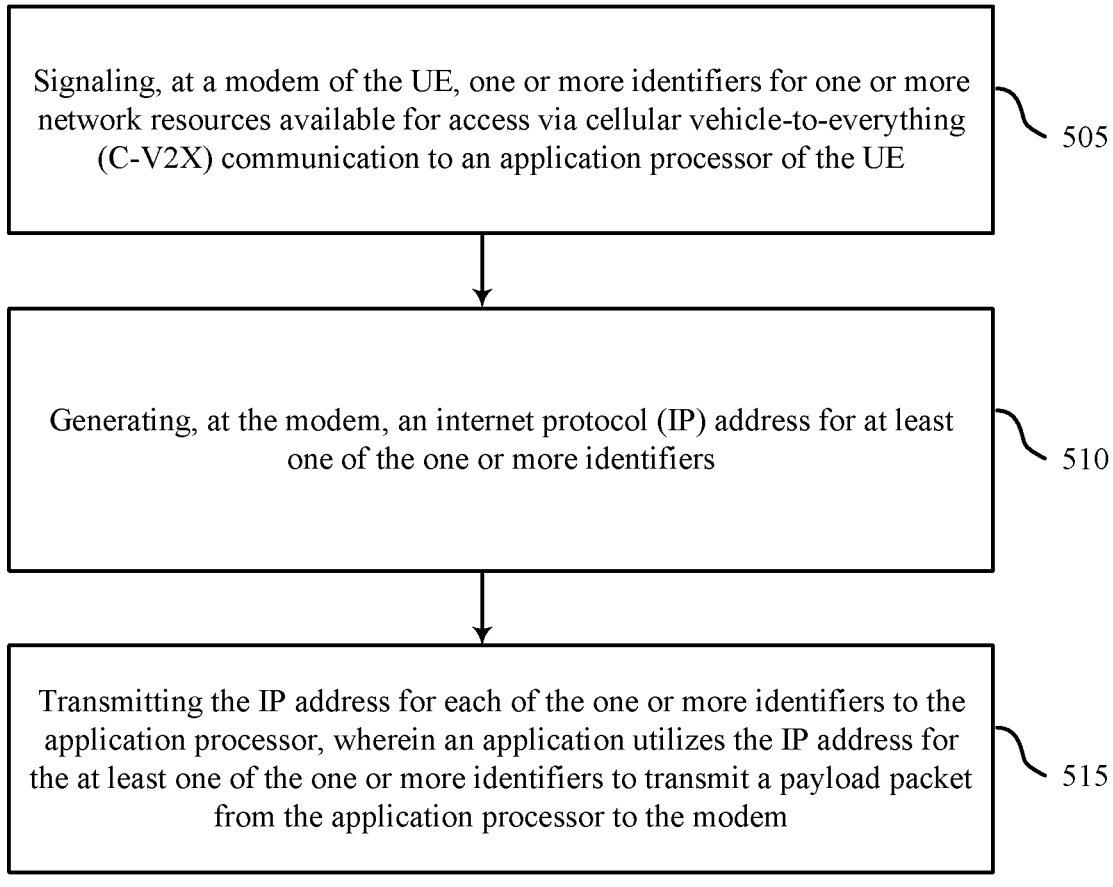
FIG. 5 is a flow diagram of an example of a method of wireless communication implemented by the UE in accordance with aspects of the present disclosure

FIG. 5 is a flowchart of an example method 500 for wireless communications in accordance with aspects of the present disclosure. The method 500 may be performed using the UE 104. Although the method 500 is described below with respect to the elements of the UE 104, other components may be used to implement one or more of the steps described herein.

At block 505, the method 500 may include signaling, at a modem of the UE, one or more identifiers for one or more network resources available for access via C-V2x to an application processor of the UE. In some examples, the one or more identifiers may be C-V2X DNN or C-V2X APN It should be appreciated the DNN may be used in the context of 5G NR communication and the APN may be used in the context of 4G LTE communication. Aspects of block 505 may be performed by communication management component 450 described with reference to FIG. 4 in conjunction with IPA 240 described with reference to FIG. 2. Thus, with respect to aspects of block 505, the modem 414, the one or more processors 412, the UE 102, the communication management component 450 or one of its subcomponents may define the means for signaling, at a modem of the UE, availability of one or more of C-V2X DNN or APN (C-V2X DNN-APN) to an application processor of the UE.

At block 510, the method 500 may include generating, at the modem, an IP address for at least one of the one or more of identifiers. Aspects of block 510 may be performed by communication management component 450 described with reference to FIG. 4 in conjunction with IPA 240 described with reference to FIG. 2. Thus, with respect to aspects of block 510, the modem 414, the one or more processors 412, the UE 102, the communication management component 450 or one of its subcomponents may define the means for generating, at the modem, an IP address for each of the one or more of C-V2X DNN or APN.

At block 515, the method 500 may include transmitting the IP address for each of the one or more of identifiers to the application processor, wherein the application may utilizes the IP address for the at least one of the one or more identifiers to transmit a payload packet from the application processor to the modem. In some examples, the application may use a standard OS API to bind a port to transmit the payload packet to the modem. The payload packet may be a non-IP or an IP packet. Thus, in some instances, the modem may determine whether the payload packet is an IP packet or a non-IP packet based on a marker attached to the payload packet. In some instances, the payload packet may be a non-IP packet that is received at the modem with an IP header affixed to the payload packet via a C-V2X non-IP APN or a C-V2X non-IP DNN corresponding to the at least one of the one or more of identifiers. Further, in some instances, the method may include discarding, at the modem, the IP header associated with the payload packet prior to transmitting the payload packet to a target device over the air (e.g., over 5G or LTE side-link). Specifically, the payload packet may be a C-V2X packet that the modem transmits to a target destination via one of a 5G NR side link radio or an LTE-D side-link radio.

The payload packet may further include a traffic class information that identifies the C-V2X packet priority for the payload packet to modem.

In one or more examples, the method may further include identifying a service ID associated with the non-IP packet based at least in part on one or more of a port from which the non-IP packet is received at the modem or an IP address associated with the packet. The method may include mapping the packet to a destination address based on the service ID, and routing the packet to the destination address based on the mapping. Additionally or alternatively, the method may include identifying a service ID associated with the payload packet based at least in part on a destination IP address of the payload packet. The method may include generating a source IP address to be used for C-V2X IP-DNN or C-V2X IP-APN of the one or more C-V2X DNN or APN when the payload packet is an IP packet received from the modem. Aspects of block 515 may be performed by transceiver 402 described with reference to FIG. 4. Thus, with respect to aspects of block 515, the modem 414, transceiver 402, the one or more processors 412, the UE 102, the communication management component 450 or one of its subcomponents may define the means for generating, at the modem, an IP address for each of the one or more of C-V2X DNN or APN.

Additionally, the method may include transmitting packets received over the air at the modem from external sources (e.g., second devices) from the modem to the access processor. The received packets may be either IP or non-IP packets. In one instance, the modem may determine that the received packet is a non-IP packet and thus attach, at the modem, an IP header to the non-IP packet prior to routing the packet to the application processor via C-V2X non-IP DNN or C-V2X non-IP APN of the one or more of C-V2X DNN or APN. In other examples, the modem may determine that the received packet is an IP packet and thus route the IP packet to the application processor via C-V2X IP APN or C-V2X IP DNN of the one or more of C-V2X DNN or APN.

Some Further Example Implementations

An example method for wireless communications implemented by a user equipment (UE), comprising: signaling, at a modem of the UE, one or more identifiers for one or more network resources available for access via C-V2X communication to an application processor of the UE; generating, at the modem, an internet protocol (IP) address for the at least one of the one or more of identifiers; transmitting the IP address for one or more of the identifiers to the application processor, wherein an application utilizes the IP address for the at least one of the one or more of identifiers to transmit a payload packet from the application processor to the modem.

The above example method, wherein the application uses a standard operating system application programming interface (API) to bind a port to transmit the payload packet to the modem.

Any of the above example methods, wherein the payload packet is a non-IP packet that is received at the modem with an IP header affixed to the payload packet via a C-V2X non-IP APN or a C-V2X non-IP DNN corresponding to the at least one of the one or more of identifiers.

Any of the above example methods, further comprising: identifying a service identification (ID) associated with the non-IP packet based at least in part on one or more of a port from which the non-IP packet is received at the modem or an IP address associated with the packet; mapping the packet to a destination address based on the service ID; and routing the packet to the destination address based on the mapping.

Any of the above example methods, further comprising: discarding, at the modem, the IP and user datagram protocol (UDP) header associated with the payload packet prior to transmitting the payload packet to a target device.

Any of the above example methods, wherein the IP header includes a traffic class information, wherein the traffic class in the IP header is overloaded to represent the C-V2X packet priority for the payload packet to the modem.

Any of the above example methods, further comprising: determining whether the payload packet is an IP packet or a non-IP packet based on a marker attached to the payload packet.

Any of the above example methods, further comprising: identifying a service identification (ID) based on the user datagram protocol (UDP) source port associated with a destination L2 address of the payload packet, wherein the payload packet is either an IP packet or a non-IP packet.

Any of the above example methods, further comprising: generating a source IP address to be used for C-V2X IP-DNN or C-V2X IP-APN corresponding to the at least one of the one or more of the identifiers, wherein the payload packet is an IP packet that is received from the modem.

Any of the above example methods, wherein the payload packet is a C-V2X packet that the modem transmits to a target destination via one of a fifth generation new radio side link radio or a long term evolution device-to-device sidelink radio.

Any of the above example methods, further comprising: receiving, at the modem of the UE, a packet from a second device; determining that the received packet is a non-IP packet; and attaching, at the modem, an IP header to the non-IP packet prior to routing the packet to the application processor via C-V2X non-IP DNN or C-V2X non-IP APN corresponding to the at least one of the one or more of the identifiers.

Any of the above example methods, further comprising: receiving, at the modem of the UE, a packet from a second device; determining that the received packet is an IP packet; and routing the IP packet to the application processor via C-V2X IP APN or C-V2X IP DNN corresponding to the at least one of the one or more of the identifiers.

Any of the above example methods, wherein the C-V2X-DNN-APN includes DNN for fifth generation (5G) new radio (NR) communication and APN for fourth generation (4G) communication.

An example apparatus for wireless communications, comprising: a memory configured to store instructions; a processor communicatively coupled with the memory, the processor configured to execute the instructions to: signal, at a modem of the UE, one or more identifiers for one or more network resources available for access via of cellular vehicle-to-everything (C-V2X) communication to an application processor of the UE; generate, at the modem, an internet protocol (IP) address for at least one of the one or more of the identifiers; transmit the IP address for each of the one or more identifiers to the application processor, wherein an application utilizes the IP address for each of the one or more of identifiers to transmit a payload packet from the application processor to the modem.

The above example apparatus, wherein the application uses a standard operating system application programming interface (API) to bind a port to transmit the payload packet to the modem.

Any of the above example apparatus, wherein the payload packet is a non-IP packet that is received at the modem with an IP header affixed to the payload packet via a C-V2X non-IP APN or a C-V2X non-IP DNN corresponding to the at least one of the one or more of the identifiers.

Any of the above example apparatus, further comprising: identifying a service identification (ID) associated with the non-IP packet based at least in part on one or more of a port from which the non-IP packet is received at the modem or an IP address associated with the packet; mapping the packet to a destination address based on the service ID; and routing the packet to the destination address based on the mapping.

Any of the above example apparatus, further comprising: discarding, at the modem, the IP and user datagram protocol (UDP) header associated with the payload packet prior to transmitting the payload packet to a target device.

Any of the above example apparatus, wherein the IP header includes a traffic class information, wherein the traffic class in the IP header is overloaded to represent the C-V2X packet priority for the payload packet to the modem.

Any of the above example methods, further comprising: determining whether the payload packet is an IP packet or a non-IP packet based on a marker attached to the payload packet.

Any of the above example apparatus, further comprising: identifying a service identification (ID) based on the user datagram protocol (UDP) source port associated with a destination L2 address of the payload packet, wherein the payload packet is either an IP packet or a non-IP packet.

Any of the above example apparatus, further comprising: generating a source IP address to be used for C-V2X IP-DNN or C-V2X IP-APN corresponding to the at least one of the one or more of the identifiers, wherein the payload packet is an IP packet that is received from the modem.

Any of the above example apparatus, wherein the payload packet is a C-V2X packet that the modem transmits to a target destination via one of a fifth generation new radio side link radio or a long term evolution device-to-device sidelink radio.

Any of the above example apparatus, further comprising: receiving, at the modem of the UE, a packet from a second device; determining that the received packet is a non-IP packet; and attaching, at the modem, an IP header to the non-IP packet prior to routing the packet to the application processor via C-V2X non-IP DNN or C-V2X non-IP APN corresponding to the at least one of the one or more of the identifiers.

Any of the above example apparatus, further comprising: receiving, at the modem of the UE, a packet from a second device; determining that the received packet is an IP packet; and routing the IP packet to the application processor via C-V2X IP APN or C-V2X IP DNN corresponding to the at least one of the one or more of the identifiers.

Any of the above example apparatus, wherein the C-V2X-DNN-APN includes DNN for fifth generation (5G) new radio (NR) communication and APN for fourth generation (4G) communication.

An example, computer readable medium storing instructions, executable by a processor, for wireless communications, comprising instructions for: signaling, at a modem of the UE, one or more identifiers for one or more network resources available for access via C-V2X communication to an application processor of the UE; generating, at the modem, an internet protocol (IP) address for at least one of the one or more of identifiers; transmitting the IP address for each of the one or more of identifiers to the application processor, wherein an application utilizes the IP address for each of the one or more of identifiers to transmit a payload packet from the application processor to the modem.

The above example computer readable medium, wherein the application uses a standard operating system application programming interface (API) to bind a port to transmit the payload packet to the modem.

Any of the above example computer readable medium, wherein the payload packet is a non-IP packet that is received at the modem with an IP header affixed to the payload packet via a C-V2X non-IP APN or a C-V2X non-IP DNN corresponding to the at least one of the one or more of the identifiers.

Any of the above example computer readable medium, further comprising: identifying a service identification (ID) associated with the non-IP packet based at least in part on one or more of a port from which the non-IP packet is received at the modem or an IP address associated with the packet; mapping the packet to a destination address based on the service ID; and routing the packet to the destination address based on the mapping.

Any of the above example computer readable medium, further comprising: discarding, at the modem, the IP and user datagram protocol (UDP) header associated with the payload packet prior to transmitting the payload packet to a target device.

Any of the above example computer readable medium, wherein the IP header includes a traffic class information, wherein the traffic class in the IP header is overloaded to represent the C-V2X packet priority for the payload packet to the modem.

Any of the above example computer readable medium, further comprising: determining whether the payload packet is an IP packet or a non-IP packet based on a marker attached to the payload packet.

Any of the above example computer readable medium, further comprising: identifying a service identification (ID) based on the user datagram protocol (UDP) source port associated with a destination L2 address of the payload packet, wherein the payload packet is either an IP packet or a non-IP packet.

Any of the above example apparatus, further comprising: generating a source IP address to be used for C-V2X IP-DNN or C-V2X IP-APN corresponding to the at least one of the one or more of the identifiers, wherein the payload packet is an IP packet that is received from the modem.

Any of the above example computer readable medium, wherein the payload packet is a C-V2X packet that the modem transmits to a target destination via one of a fifth generation new radio side link radio or a long term evolution device-to-device side-link radio.

Any of the above example computer readable medium, further comprising: receiving, at the modem of the UE, a packet from a second device; determining that the received packet is a non-IP packet; and attaching, at the modem, an IP header to the non-IP packet prior to routing the packet to the application processor via C-V2X non-IP DNN or C-V2X non-IP APN corresponding to the at least one of the one or more of the identifiers.

Any of the above example computer readable medium, further comprising: receiving, at the modem of the UE, a packet from a second device; determining that the received packet is an IP packet; and routing the IP packet to the application processor via C-V2X IP APN or C-V2X IP DNN corresponding to the at least one of the one or more of the identifiers.

Any of the above example computer readable medium, wherein the C-V2X-DNN-APN includes DNN for fifth generation (5G) new radio (NR) communication and APN for fourth generation (4G) communication.

An example apparatus for wireless communications implemented by a user equipment (UE), comprising: means for signaling, at a modem of the UE, one or more identifiers for one or more network resources available for access via C-V2X communication to an application processor of the UE; means for generating, at the modem, an internet protocol (IP) address for each of the one or more of identifiers; means for transmitting the IP address for each of the one or more of identifiers to the application processor, wherein an application utilizes the IP address for each of the one or more of identifiers to transmit a payload packet from the application processor to the modem.

The above example apparatus, wherein the application uses a standard operating system application programming interface (API) to bind a port to transmit the payload packet to the modem.

Any of the above example apparatus, wherein the payload packet is a non-IP packet that is received at the modem with an IP header affixed to the payload packet via a C-V2X non-IP APN or a C-V2X non-IP DNN corresponding to the at least one of the one or more of the identifiers.

Any of the above example apparatus, further comprising: means for identifying a service identification (ID) associated with the non-IP packet based at least in part on one or more of a port from which the non-IP packet is received at the modem or an IP address associated with the packet; means for mapping the packet to a destination address based on the service ID; and routing the packet to the destination address based on the mapping.

Any of the above example apparatus, further comprising: means for discarding, at the modem, the IP and user datagram protocol (UDP) header associated with the payload packet prior to transmitting the payload packet to a target device.

Any of the above example apparatus, wherein the IP header includes a traffic class information, wherein the traffic class in the IP header is overloaded to represent the C-V2X packet priority for the payload packet to the modem.

Any of the above example apparatus, further comprising: means for determining whether the payload packet is an IP packet or a non-IP packet based on a marker attached to the payload packet.

Any of the above example apparatus, further comprising: means for identifying a service identification (ID) based on the user datagram protocol (UDP) source port associated with a destination L2 address of the payload packet, wherein the payload packet is either an IP packet or a non-IP packet.

Any of the above example apparatus, further comprising: means for generating a source IP address to be used for C-V2X IP-DNN or C-V2X IP-APN corresponding to the at least one of the one or more of the identifiers, wherein the payload packet is an IP packet that is received from the modem.

Any of the above example apparatus, wherein the payload packet is a C-V2X packet that the modem transmits to a target destination via one of a fifth generation new radio side link radio or a long term evolution device-to-device side-link radio.

Any of the above example apparatus, further comprising: means for receiving, at the modem of the UE, a packet from a second device; determining that the received packet is a non-IP packet; and attaching, at the modem, an IP header to the non-IP packet prior to routing the packet to the application processor via C-V2X non-IP DNN or C-V2X non-IP APN corresponding to the at least one of the one or more of the identifiers.

Any of the above example apparatus, further comprising: means for receiving, at the modem of the UE, a packet from a second device; determining that the received packet is an IP packet; and routing the IP packet to the application processor via C-V2X IP APN or C-V2X IP DNN corresponding to the at least one of the one or more of the identifiers.

Any of the above example apparatus, wherein the C-V2X-DNN-APN includes DNN for fifth generation (5G) new radio (NR) communication and APN for fourth generation (4G) communication.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications implemented by a user equipment (UE), comprising:
    signaling, at a modem of the UE, one or more identifiers for one or more network resources available for access via cellular vehicle-to-everything (C-V2X) communication to an application processor of the UE;
    generating, at the modem, an internet protocol (IP) address for at least one of the one or more identifiers;
    transmitting the IP address for each of the one or more identifiers to the application processor, wherein an application utilizes the IP address for the at least one of the one or more identifiers to transmit a payload packet from the application processor to the modem.

2. The method of claim 1, wherein the application uses a standard operating system application programming interface (API) to bind a port to transmit the payload packet to the modem.

3. The method of claim 1, wherein the payload packet comprises a non-IP packet that is received at the modem with an IP header affixed to the payload packet via a C-V2X non-IP access point name (APN) or a C-V2X non-IP data network name (DNN) corresponding to the at least one of the one or more identifiers.

4. The method of claim 3, further comprising:
identifying a service identification (ID) associated with the non-IP packet based at least in part on one or more of a port from which the non-IP packet is received at the modem or an IP address associated with the packet;
mapping the packet to a destination address based on the service ID; and
routing the packet to the destination address based on the mapping.

5. The method of claim 3, further comprising:
discarding, at the modem, the IP and user datagram protocol (UDP) header associated with the payload packet prior to transmitting the payload packet to a target device.

6. The method of claim 1, wherein the IP header includes a traffic class information, wherein the traffic class in the IP header is overloaded to represent a C-V2X packet priority for the payload packet to the modem.

7. The method of claim 1, further comprising:
determining whether the payload packet comprises an IP packet or a non-IP packet based on a marker attached to the payload packet.

8. The method of claim 1, further comprising:
identifying a service identification (ID) based on a user datagram protocol (UDP) source port associated with a destination L2 address of the payload packet, wherein the payload packet comprises either an IP packet or a non-IP packet.

9. The method of claim 1, further comprising:
generating a source IP address to be used for C-V2X IP— data network name (DNN) or C-V2X IP— access point name (APN) corresponding to the at least one of the one or more of identifiers, wherein the payload packet is an IP packet that is received from the modem.

10. The method of claim 1, wherein the payload packet is a C-V2X packet that the modem transmits to a target destination via one of a fifth generation new radio side link radio or a long term evolution device-to-device side-link radio.

11. The method of claim 1, further comprising:
receiving, at the modem of the UE, a packet from a second device;
determining that the received packet is a non-IP packet; and
attaching, at the modem, an IP header to the non-IP packet prior to routing the packet to the application processor via C-V2X non-IP data network name (DNN) or C-V2X non-IP access point name (APN) corresponding to the at least one of the one or more of identifiers.

12. The method of claim 1, further comprising:
receiving, at the modem of the UE, a packet from a second device;
determining that the received packet is an IP packet; and
routing the IP packet to the application processor via a C-V2X IP—data network name (DNN) or a C-V2X IP—access point name (APN) corresponding to the at least one of the one or more of identifiers.

13. The method of claim 1, wherein the identifier includes C-V2X data network name (DNN) for fifth generation (5G) new radio (NR) communication and C-V2X access point name (APN) for fourth generation (4G) communication.

14. An apparatus for wireless communications, comprising:
a memory configured to store instructions;
a processor communicatively coupled with the memory, the processor configured to execute the instructions to:
signal, at a modem of the UE, one or more identifiers for one or more network resources available for access via cellular vehicle-to-everything (C-V2X) communication to an application processor of the UE;
generate, at the modem, an internet protocol (IP) address for at least one of the one or more identifiers; and
transmit the IP address for each of the one or more identifiers to the application processor, wherein an application utilizes the IP address for the at least one of the one or more identifiers to transmit a payload packet from the application processor to the modem.

15. The apparatus of claim 14, wherein the application uses a standard operating system application programming interface (API) to bind a port to transmit the payload packet to the modem.

16. The apparatus of claim 14, wherein the payload packet comprises a non-IP packet that is received at the modem with an IP header affixed to the payload packet via a C-V2X non-IP access point name (APN) or a C-V2X non-IP data network name (DNN) corresponding to the at least one of the one or more identifiers.

17. The apparatus of claim 16, wherein the processor is further configured to execute the instructions to:
identify a service identification (ID) associated with the non-IP packet based at least in part on one or more of a port from which the non-IP packet is received at the modem or an IP address associated with the packet;
map the packet to a destination address based on the service ID; and
route the packet to the destination address based on the mapping.

18. The apparatus of claim 16 wherein the processor is further configured to execute the instructions to:
discard, at the modem, the IP and user datagram protocol (UDP) header associated with the payload packet prior to transmitting the payload packet to a target device.

19. The apparatus of claim 14, wherein the IP header includes a traffic class information, wherein the traffic class in the IP header is overloaded to represent a C-V2X packet priority for the payload packet to the modem.

20. The apparatus of claim 14, wherein the processor is further configured to execute the instructions to:
determine whether the payload packet comprises an IP packet or a non-IP packet based on a marker attached to the payload packet.

21. The apparatus of claim 14, wherein the processor is further configured to execute the instructions to:
identify a service identification (ID) based on a user datagram protocol (UDP) source port associated with a destination L2 address of the payload packet, wherein the payload packet comprises either an IP packet or a non-IP packet.

22. The apparatus of claim 14, wherein the processor is further configured to execute the instructions to:
generate a source IP address to be used for C-V2X IP— data network name (DNN) or C-V2X IP— access point name (APN) corresponding to the at least one of the one or more of identifiers, wherein the payload packet is an IP packet that is received from the modem.

23. The apparatus of claim 14, wherein the payload packet is a C-V2X packet that the modem transmits to a target destination via one of a fifth generation new radio side link radio or a long term evolution device-to-device side-link radio.

24. The apparatus of claim 14, wherein the processor is further configured to execute the instructions to:
receive, at the modem of the UE, a packet from a second device;
determine that the received packet is a non-IP packet; and
attaching, at the modem, an IP header to the non-IP packet prior to routing the packet to the application processor via C-V2X non-IP data network name (DNN) or C-V2X non-IP access point name (APN) corresponding to the at least one of the one or more of identifiers.

25. The apparatus of claim 14, wherein the processor is further configured to execute the instructions to:
receive, at the modem of the UE, a packet from a second device;
determine that the received packet is an IP packet; and
route the IP packet to the application processor via a C-V2X IP— data network name (DNN) or a C-V2X IP— access point name (APN) corresponding to the at least one of the one or more of identifiers.

26. The apparatus of claim 14, wherein the identifier includes C-V2X data network name (DNN) for fifth generation (5G) new radio (NR) communication and C-V2X access point name (APN) for fourth generation (4G) communication.

27. A non-transitory computer readable medium storing instructions, executable by a processor, for wireless communications, comprising instructions for:
signaling, at a modem of the UE, one or more identifiers for one or more network resources available for access via cellular vehicle-to-everything (C-V2X) communication to an application processor of the UE;
generating, at the modem, an internet protocol (IP) address for at least one of the one or more identifiers; and
transmitting the IP address for each of the one or more identifiers to the application processor, wherein an application utilizes the IP address for the at least one of the one or more identifiers to transmit a payload packet from the application processor to the modem.

28. The non-transitory computer readable medium of claim 27, wherein the application uses a standard operating system application programming interface (API) to bind a port to transmit the payload packet to the modem.

29. The non-transitory computer readable medium of claim 27, wherein the payload packet comprises a non-IP packet that is received at the modem with an IP header affixed to the payload packet via a C-V2X non-IP access point name (APN) or a C-V2X non-IP data network name (DNN) corresponding to the at least one of the one or more identifiers.

30. An apparatus for wireless communications, comprising:
means for signaling, at a modem of the UE, one or more identifiers for one or more network resources available for access via cellular vehicle-to-everything (C-V2X) communication to an application processor of the UE;
means for generating, at the modem, an internet protocol (IP) address for at least one of the one or more identifiers; and
means for transmitting the IP address for each of the one or more identifiers to the application processor, wherein an application utilizes the IP address for the at least one of the one or more identifiers to transmit a payload packet from the application processor to the modem.

* * * * *